United States Patent

Yamaya et al.

[11] Patent Number: 5,081,200
[45] Date of Patent: Jan. 14, 1992

[54] LOW STAINABLE PRIMER COMPOSITION AND METHOD OF PRODUCING THE SAME

[75] Inventors: Masaaki Yamaya; Hideyoshi Yanagisawa; Toshio Yamazaki; Masayuki Takahashi, all of Gunma, Japan

[73] Assignee: Shin-Etsu Chemical Co., Ltd., Tokyo, Japan

[21] Appl. No.: 596,181

[22] Filed: Oct. 12, 1990

[30] Foreign Application Priority Data

Oct. 13, 1989 [JP] Japan .................. 1-267265

[51] Int. Cl.$^5$ .......................................... C08G 77/06
[52] U.S. Cl. .................................. 528/18; 528/28; 528/30; 556/414
[58] Field of Search .................. 528/18, 28, 30; 556/414

[56] References Cited

U.S. PATENT DOCUMENTS

| | | | |
|---|---|---|---|
| 3,388,144 | 6/1968 | Musolf et al. | 528/30 |
| 3,502,704 | 3/1970 | McKellar | 556/414 |
| 4,234,697 | 11/1980 | Homan et al. | 528/30 |
| 4,839,455 | 6/1989 | Fong | 528/18 |
| 4,857,623 | 8/1989 | Emmerling et al. | 528/30 |

Primary Examiner—Melvyn I. Marquis
Assistant Examiner—Margaret W. Glass
Attorney, Agent, or Firm—Millen, White & Zelano

[57] ABSTRACT

A primer composition comprising a product of the reaction between an organosilane compound of the following general formula (A) and a phenyl group-free organic diisocyanate compound to acquire a high curing speed and excellent adhesiveness to both inorganic and organic materials and to resist generation of stain after curing:

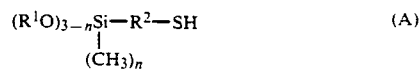

$$(R^1O)_{3-n}\underset{\underset{(CH_3)_n}{|}}{Si}-R^2-SH \qquad (A)$$

wherein $R^1$ represents a monovalent hydrocarbon residue containing 1 to 4 carbon atoms; $R^2$ represents a divalent hydrocarbon residue containing 1 to 4 carbon atoms; and n represents 0, 1 or 2.

16 Claims, No Drawings

LOW STAINABLE PRIMER COMPOSITION AND METHOD OF PRODUCING THE SAME

FIELD OF THE INVENTION

This invention relates to a primer composition to be used in causing an organic polymer to adhere to the surface of an inorganic base material and, more particularly, to a primer composition comprising an isocyanate group-containing silane compound as a main component and a method of producing said primer composition.

BACKGROUND OF THE INVENTION

In purposing to make an organic polymer adhere to the surface of a metal, glass or the like, it has so far been required to carry out a pretreatment. As for the pretreatment for such a purpose, a so-called "primer treatment" is a particularly effective method, because it is simple in respect of treating process, and excellent in adhesiveness.

In primer compositions for the above-described treatment, various kinds of silane compounds have been employed. Specific examples of such silane compounds include γ-amino-propyltriethoxysilane, N-β-aminoethyl-γ-aminopropyltrimethoxysilane, γ-glycidoxypropyltrimethoxysilane, γ-mercaptopropyltrimethoxysilane, hydrolytic condensation products of these silane compounds, and so on.

In addition, primer compositions using the mixtures produced by the reaction of various kinds of aminosilanes with organic polyisocyanates are disclosed (Japanese Patent Kokoku, examined Japanese patent publication, No. 31550/'89.)

However, those primer compositions are generally slow in curing speed. In particular, the primer compositions utilizing aminosilanes have a defect that they are stained (or colored) by heat drying subsequent to coating.

On the other hand, the product of the reaction between γ-mercaptopropyltrimethoxysilane and tolylenediisocyanate has also been used as a primer composition. This reaction product has a high curing speed and excellent adhesiveness.

However, this primer composition also has a defect that it yellows through staining with a lapse of time after curing. Therefore, it has a problem that it cannot be used as a primer for coating of a coating material of light colors, such as white, pink, etc., e.g., clear lacquer.

As a result of concentrating our energies on solution of the above-described problems, it has now been found that a primer composition containing as a main component the reaction product of a mercaptosilane compound as defined hereinafter with a phenyl group-free organic diisocyanate compound, is only slightly stained after curing, causes no change in color when used as a primer of coating materials of light colors, such as clear lacquer, and can ensure excellent adhesiveness and water-resisting property.

Therefore, an object of this invention is to provide a primer composition which has a high curing speed, enables strong adhesion between the surface of a metal or an inorganic base material and an organic polymer such as paint or lacquer, causes no change in color with a lapse of time, and is well suited to be used for transparent materials, light colored coating materials, and the like.

SUMMARY OF THE INVENTION

The above-described object of this invention is attained with a primer composition containing as a main component the product of the reaction between an organosilane compound of the following general formula (A) and a phenyl group-free organic diisocyanate compound:

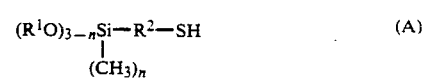

In accordance with this invention, the primer composition does not cause any change in color after curing, has high reactivity owing to the presence of unreacted isocyanate group, and enables tight adhesion of an organic polymer to the surface of an inorganic base material.

DETAILED DESCRIPTION OF THE INVENTION

In the above formula (A), $R^1$ represents a monovalent hydrocarbon residue containing 1 to 4 carbon atom, with specific examples including

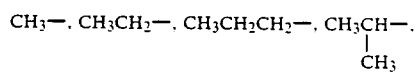

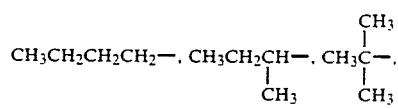

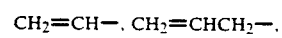

and the like.

$R^2$ represents a divalent hydrocarbon residue containing 1 to 4 carbon atoms, with specific examples including

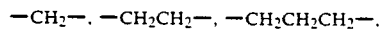

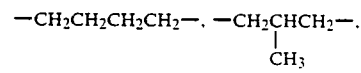

and the like. n lies from 0 to 2.

Specific examples of an organosilane compound represented by the general formula (A) include

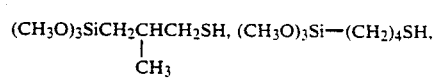

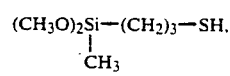

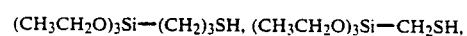

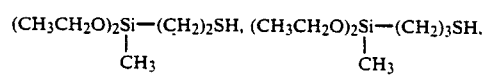

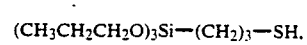

-continued

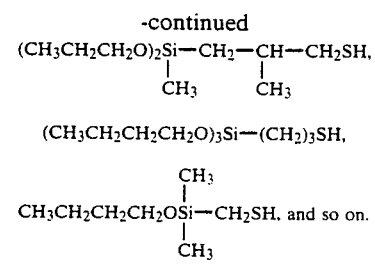

Organic diisocyanate compounds to be used in this invention may include any compounds, provided that they don't contain phenyl group. As examples of such phenyl group-free diisocyanate compounds, mention may be made of:

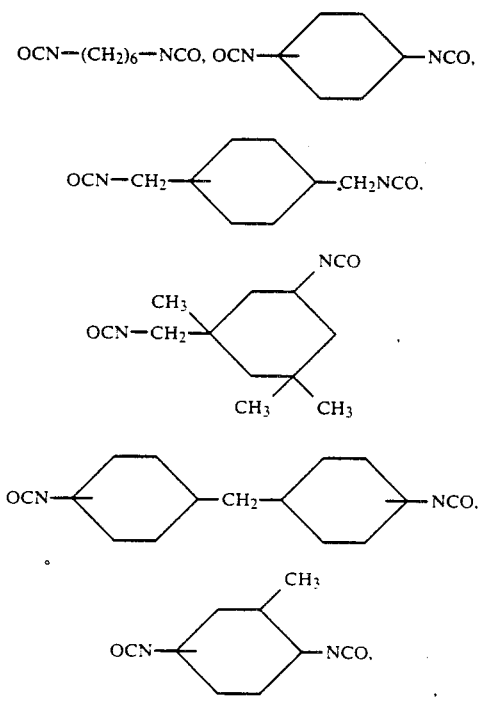

and so on.

In allowing the foregoing organosilane and diisocyanate compounds to react with each other, a molar ratio between them can be chosen arbitrarily. In practice, it is desirable in respects of curing speed and adhesiveness that the diisocyanate compound should be used in a proportion of from 1.2 to 3.0 moles, based on isocyanate group, to 1 mole (based on mercapto group) of organosilane compound. When the ratio of the isocyanate group to the mercapto group is smaller than 1.2 by mole, the reactivity is lowered due to shortage of the isocyanate group to cause a decrease in curing speed or insufficiency of the extent of curing. On the other hand, when the ratio is larger than 3.0 by mole, there are produced some problems that a curing speed becomes too high to effect the uniform coating, coloration occurs through burette reaction, and so on because the organic diisocyanate compound remaining without undergoing the reaction is present in excess, and adhesiveness to a base material is lowered because of deficiency of the alkoxysilyl group.

In this invention, such a special combination that γ-mercaptopropyltrimethoxysilane is employed as the oganosilane compound represented by the general formula (A) and hexamethylenediisocyanate compound is used as the organic diisocyanate compound can ensure excellent properties to the primer composition.

The reaction of the silane compound of the foregoing general formula (A) with an organic diisocyanate compound, though doesn't have any particular limitation, is effected as follows: An organic diisocyanate compound is stocked in a proper solvent, such as esters including ethyl acetate, methyl acetate, isobutyl acetate, methoxyethyl acetate, etc., ketones including methyl ethyl ketone, methyl isobutyl ketone, diethyl ketone, etc., and thereto is added an organotin compound, e.g., dibutyltindilaurate, dibutyltindioleate, or so on, as a catalyst. To the resulting solution is dropwise added the silane compound represented by the general formula (A) at a temperature of 50°-150° C., and further the stirring is continued for 2-4 hours with heating to a temperature of 50°-150° C.

The reaction product obtained in the above-described manner may be diluted with a certain solvent upon practical use, if desired. Suitable examples of a solvent for dilution include esters such as ethyl acetate, methyl acetate, isobutyl acetate, methoxyethyl acetate, ethoxymethyl acetate, etc., ketones such as acetone, methyl ethyl ketone, diethyl ketone, methyl isobutyl ketone, etc, hydrocarbons such as benzene, toluene, xylene, hexane, pentane, decane, etc., and so on. As for the embodiment preferred from the standpoint of the working efficiency, the foregoing reaction product is coated as it is or after the dilution, or incorporated into a resin for the last coat.

To the primer composition of this invention, various additives, which have usually been added, can be added properly in addition to the foregoing reaction product.

Since the thus obtained primer composition contains unreacted isocyanate group in a proper quantity, it is excellent in reactivity, and effective as a primer particularly in coating an organic polymer, e.g., paint, lacquer, etc., on the surface of an inorganic base material such as metal, glass, or so on.

In addition, since it is hard to change its color after curing because of the absence of phenyl group, the composition is suitable in particular for the application of a transparent material or a paint of light color such as white, pink, etc. to the surface of an inorganic material.

EXAMPLE

This invention will now be illustrated in greater detail by reference to the following examples. However, the invention should not be construed as being limited to these examples.

EXAMPLE 1

Preparation of Primer Composition 168.2 g (1.0 mole) of hexamethylenediisocyanate and 364.2 g of ethyl acetate were laid in a 1.1 of separable flask equipped with a stirrer, a condenser and a thermometer, and heated to 60° C. in a stream of nitrogen. Thereto, 2.9 g of dibutyltin dilaurate, and successively 196.0 g (1.0 mole) of γ-mercaptopropyltrimethoxysilane were added dropwise at 60° C.-70° C. Further, the reaction mixture was stirred for 5 hours at 70° C. At the conclusion of the reaction, the reaction mixture was examined for a content of the residual isocyanate group. It was 1.38 mol/kg. The thus obtained reaction product was cooled, and admixed with 740 g of ethyl acetate and 740 g of toluene with stirring to prepare a primer composition of this invention.

This composition had a viscosity of 0.80 cs and a specific gravity of 0.916 at 25° C. On the other hand, a proportion of the nonvolatile component remaining after 3-hour heating at 105° C. was 13.5 weight %.

Preparation of Polyurethane Elastomer for Adhesion Test 150 parts of polyoxytetramethylene glycol having a molecular weight of 1,000; 100 parts of 1,6-xyleneglycol, 0.5 part of water, 200 parts of hexamethylenediisocyanate and 800 parts of dimethylformamide were mixed with stirring, and heated to 90° C. The stirring was continued for 2 hours at that temperature to run the reaction. Thereafter, 3 parts of dibutylamine was added to stop the reaction, and then excess dibutylamine was neutralized with acetic anhydride to prepare a polyurethane elastomer.

Adhesion and Stain Tests

The above-described primer composition prepared in an accordance with this invention was coated on three kinds of base materials, a glass plate, an iron plate and an aluminum plate, respectively with a brush, dried at 120° C. for 5 minutes and further thereon, the polyurethane elastomer was coated with a brush, followed by drying at 100° C. for 10 minutes. Then, the coat was incised longitudinally and latitudinally at 1-millimeter intervals to form 100 pieces of squares, and thereon was pressed adhesive tape. When the adhesive tape was peeled apart, there were no peeled squares, that is to say, the adhesiveness achieved was extremely good, in case of any base material's being used.

On the other hand, the primer composition coated with a brush was dried at 120° C. for 5 minutes, and then placed in s sunshine weather meter for 100 hours. However, any stain was not observed at all.

Starting materials and ratio between them in the preparation of each primer composition are listed in Table 1, and the results of adhesion and stain tests are shown in Table 2.

EXAMPLEs 2 TO 9

Primer compositions were prepared in the same manner as in Example 1, except that the starting materials and the ratio between them were replaced by those illustrated in Table 1, respectively. Evaluation tests thereof were made according to the same methods as in Example 1, and the results obtained are also shown in Table 3.

TABLE 1

| Example | Starting Material 1 | Starting Material 2 | Ratio (by mole) |
|---|---|---|---|
| 1 | HS$-$(CH$_2$)$_3$Si(OCH$_3$)$_3$ | OCN$-$(CH$_2$)$_6$NCO | 1/1 |
| 2 | HS$-$(CH$_2$)$_3$Si(OCH$_3$)$_3$ | 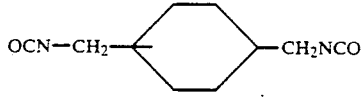 OCN—CH$_2$—⬡—CH$_2$NCO | 1/1 |
| 3 | HS$-$(CH$_2$)$_3$Si(OCH$_3$)$_3$ | 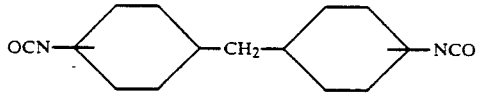 OCN—⬡—CH$_2$—⬡—NCO | 1/1 |
| 4 | HS$-$(CH$_2$)$_3$Si(OCH$_3$)$_3$ | OCN$-$(CH$_2$)$_6$NCO | 1/0.6 |
| 5 | HS$-$(CH$_2$)$_3$Si(OCH$_3$)$_3$ | OCN$-$(CH$_2$)$_6$NCO | 1/1.5 |
| 6 | HS$-$CH$_2$Si(OCH$_3$)$_3$ | OCN$-$(CH$_2$)$_6$NCO | 1/1 |
| 7 | HS$-$(CH$_2$)$_3$Si(OCH$_2$CH$_3$)$_3$ | OCN$-$(CH$_2$)$_6$NCO | 1/1 |
| 8 | HS$-$(CH$_2$)$_3$Si(CH$_3$)$_2$OCH$_3$ | OCN$-$(CH$_2$)$_6$NCO | 1/1 |
| 9 | HS$-$(CH$_2$)$_3$Si(CH$_3$)(OCH$_2$CH$_3$)$_2$ | OCN$-$(CH$_2$)$_6$NCO | 1/1 |

COMPARATIVE EXAMPLES 1 TO 3

Primer compositions were prepared in the same manner as in Example 1, except that the starting materials and the ratio between them were replaced by those illustrated in Table 2, respectively. Evaluation tests thereof were made according to the same methods as in Example 1, and the results obtained are also shown in Table 3.

TABLE 2

| Comparative Example | Starting Material 1 | Starting Material 2 | Ratio (by mole) |
|---|---|---|---|
| 1 | HS$-$(CH$_2$)$_3$Si(OCH$_3$)$_3$ | 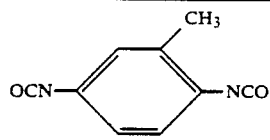 OCN—⬡(CH$_3$)—NCO | 1/1 |

TABLE 2-continued

| Comparative Example | Starting Material 1 | Starting Material 2 | Ratio (by mole) |
|---|---|---|---|
| 2 | $HS{-}(CH_2)_3Si(OCH_3)_3$ | $CN{-}\langle\bigcirc\rangle{-}CH_2{-}\langle\bigcirc\rangle{-}NCO$ | 1/1 |
| 3 | $HS{-}(CH_2)_3Si(OCH_2CH_3)_3$ | $OCN{-}\langle\bigcirc\rangle{-}NCO$ (with $CH_3$ substituent) | 1/1 |

TABLE 3

| Base Material | Primer Composition | Stained Condition | Adhesiveness |
|---|---|---|---|
| Glass plate | Example 1 | not stained | 100/100 |
|  | Example 2 | not stained | 100/100 |
|  | Example 3 | not stained | 100/100 |
|  | Example 4 | not stained | 100/100 |
|  | Example 5 | not stained | 100/100 |
|  | Example 6 | not stained | 100/100 |
|  | Example 7 | not stained | 100/100 |
|  | Example 8 | not stained | 100/100 |
|  | Example 9 | not stained | 100/100 |
|  | Comparative Example 1 | stained in light yellow | 100/100 |
|  | Comparative Example 2 | stained in light yellow | 100/100 |
|  | Comparative Example 3 | stained in light yellow | 100/100 |
|  | Comparative Example 4 | not stained | 94/100 |
|  | Comparative Example 5 | stained in light yellow | 99/100 |
|  | Comparative Example 6 | stained in light yellow | 100/100 |
| Aluminum plate | Example 1 | not stained | 100/100 |
|  | Example 2 | not stained | 100/100 |
|  | Example 3 | not stained | 100/100 |
|  | Comparative Example 1 | stained in light yellow | 100/100 |
|  | Comparative Example 2 | stained in light yellow | 100/100 |
| Iron plate | Example 1 | not stained | 100/100 |
|  | Example 2 | not stained | 100/100 |
|  | Example 3 | not stained | 100/100 |
|  | Comparative Example 1 | stained in light yellow | 100/100 |
|  | Comparative Example 2 | stained in light yellow | 100/100 |

COMPARATIVE EXAMPLE 4

15 parts of γ-mercaptopropyltrimethoxysilane was dissolved in a mixed solvent consisting of 50 parts of ethylacetate and 35 parts of toluene to prepare a primer composition. The resulting primer composition was subjected to the same evaluation test as in Example 1. As shown in Table 3, the adhesiveness given by this primer composition was insufficient.

COMPARATIVE EXAMPLE 5

15 parts of γ-aminopropyltrimethoxysilane was dissolved in 85 parts of ethyl acetate to prepare a primer composition. The resulting primer composition was subjected to the same evaluation test as in Example 1. As shown in Table 3, not only the adhesiveness of this composition was insufficient, but also the cured composition was prevented from staining to an unsatisfactory extent.

COMPARATIVE EXAMPLE 6

15 parts of N-β-aminoethyl-γ-aminopropyltrimethoxysilane was dissolved in 85 parts of ethyl acetate to prepare a primer composition. The resulting primer composition was subjected to the same evaluation test as in Example 1.

As shown in Table 3, the adhesiveness of this composition was satisfactory, but the cured composition was prevented from staining to an insufficient extent.

The results obtained in the above-described examples and comparative examples have substantiated that the primer compositions of this invention can ensure both desirable adhesiveness and satisfactory prevention of staining.

What is claimed is:

1. A primer composition comprising a product of the reaction between an organosilane compound of the following general formula (A) and a phenyl group-free organic diisocyanate compound:

$$(R^1O)_{3-n}\underset{(CH_3)_n}{Si}{-}R^2{-}SH \qquad (A)$$

wherein $R^1$ represents a monovalent hydrocarbon residue containing 1 to 4 carbon atoms; $R^2$ represents a divalent hydrocarbon residue containing 1 to 4 carbon atoms; and n represents 0, 1 or 2.

2. The primer composition of claim 1, wherein said $R^1$ in the general formula (A) is a group selected from a class consisting of methyl, ethyl, propyl, isopropyl, butyl, isobutyl, tertiary butyl, vinyl and propenyl groups.

3. The primer composition of claim 1, wherein said $R^2$ in the general formula (A) is a group selected from a class consisting of methylene, ethylene, propylene, butylene and isobutylene groups.

4. The primer composition of claim 2, wherein the $R^2$ in the general formula (A) is a group selected form a class consisting of methylene, ethylene, propylene, butylene and isobutylene groups.

5. The primer composition of claim 1, wherein said organic silane compound represented by the general formula (A) is a compound selected from the group consisting of $$(CH_3O)_3Si{-}(CH_2)_3{-}SH, \quad (CH_3O)_3SiCH_2SH,$$

$$(CH_3O)_3SiCH_2\underset{CH_3}{CH}CH_2SH, \quad (CH_3O)_3Si{-}(CH_2)_4{-}SH,$$

-continued

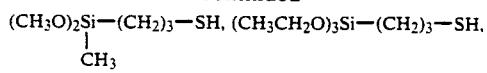

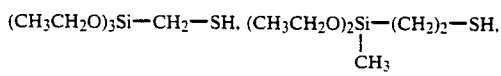

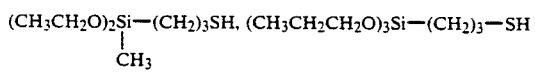

and $(CH_3CH_2CH_2CH_2O)_3Si—(CH_2)_3SH$.

6. The primer composition of claim 1, wherein said organic diisocyanate compound is a compound selected from the group consisting of;

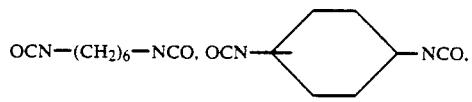

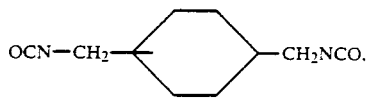

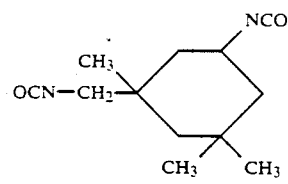

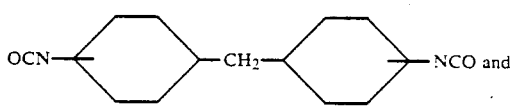

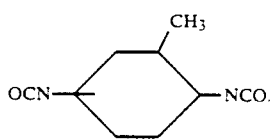

7. The primer composition of claim 1, wherein said organic silane compound and said organic diisocyanate compound are used in such amounts that a ratio of isocyanate group to mercapto group to be present in the reaction system may range from 1.2:1 to 3.0:1 by mole.

8. The primer composition of claim 6, wherein the organic silane compound represented by the general formula (A) is γ-mercaptopropyltrimethoxysilane, and said organic diisocyanate compound is a hexamethylenediisocyanate compound.

9. The primer composition of claim 7, wherein said organic silane compound represented by the general formula (A) is γ-mercaptopropyltrimethoxysilane, and said organic diisocyanate compound is a hexamethylenediisocyanate compound.

10. A method of producing a primer composition, wherein the main component of said primer composition is produced by the reaction comprising processes of laying a phenyl group-free organic diisocyanate compound in a solvent, adding thereto an organic tin compound as a catalyst, and then adding dropwise a silane compound represented by the general formula (A) under a temperature of 50°-150° C. and, after the dropwise addition, stirring them for from 2 to 4 hours at a temperature of 50°-150° C.:

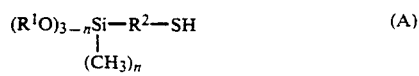

wherein $R^1$ represents a monovalent hydrocarbon residue of 1 to 4 carbon atoms; $R^2$ represents a divalent hydrocarbon residue of 1 to 4 carbon atoms; and n represents 0, 1 or 2.

11. The primer composition producing method of claim 10, wherein said organic silane compound and said organic diisocyanate compound are used in such amounts that a ratio of isocyanate group to mercapto group to be present in the reaction system may range from 1.2:1 to 3.0:1 by mole.

12. The primer composition producing method of claim 10, wherein said solvent in which the organic diisocyanate compound is laid is selected from a class consisting of esters, ketones and hydrocarbons.

13. The primer composition producing method of claim 12, wherein said eaters include methyl acetate, ethyl acetate, isobutyl acetate and methoxyethyl acetate.

14. The primer composition producing method of claim 10, wherein said ketones include methyl ethyl ketone, methyl isobutyl ketone and diethyl ketone.

15. The primer composition producing method of claim 12, wherein said hydrocarbons include benzene, toluene, xylene and hexane.

16. A method of producing a primer composition, which comprises diluting with a diluent the reaction product formed by laying a phenyl group-free organic diisocyanate compound in a solvent, adding thereto an organic tin compound as a catalyst, and then adding dropwise a silane compound represented by the general formula (A) under a temperature of 50°-150° C. and, after the dropwise addition, stirring them for from 2 to 4 hours at a temperature of 50°-150° C.:

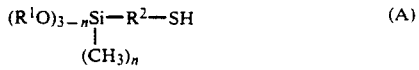

wherein $R^1$ represents a monovalent hydrocarbon residue containing 1 to 4 carbon atoms; $R^2$ represents a divalent hydrocarbon residue containing 1 to 4 carbon atoms; and n represents 0, 1 or 2.

* * * * *